UNITED STATES PATENT OFFICE.

HERBERT H. BROOKS, OF MEDFORD, MASSACHUSETTS.

FLEXIBLE TUBE.

SPECIFICATION forming part of Letters Patent No. 536,417, dated March 26, 1895.

Application filed September 18, 1894. Serial No. 523,364. (No model.)

*To all whom it may concern:*

Be it known that I, HERBERT H. BROOKS, a citizen of the United States, residing at Medford, in the county of Middlesex and State of Massachusetts, have invented certain new and useful Improvements in Flexible Tubes, of which the following is a specification, reference being had therein to the accompanying drawings.

Electrical wires or cables are frequently placed in a tube or conduit of metal,—commonly a leaden tube,—which serves to protect them from injury. It is desirable that these tubes or conduits should be of such character that they will not be readily compressed or indented but will maintain a uniform interior cross sectional shape throughout their entire length. Such conduits or tubes are frequently required to be bent in order that they may be placed in a desired position, and it is important that they be of such construction that they may be bent without changing the cross sectional shape of the interior space thereof. Such leaden tubes or conduits as are now constructed are usually provided interiorly with a tube of stiff material which forms a lining for the outer tube, or conduit proper, and which serves to brace the said outer tube and prevent it from becoming distorted or indented. The said inner tube is of ordinary construction and while it serves its purpose to prevent indentation or distortion throughout the straight portions of the tube or conduit, its use prevents the tube or conduit from being bent and it also necessitates the construction of the straight portions of the conduit in comparatively short lengths which require subsequently to be joined together, while the curved portions require to be separately constructed in the exact form or curve required for a given location.

My invention has for its object to provide a flexible metallic tube or conduit of such character that its interior space will maintain a uniform cross section whether the tube be curved or straight, and which may be constructed in very long lengths, thus doing away with the necessity of frequent joints and of specially constructed curves.

My invention is fully set forth in the following description and is more particularly pointed out in the claim at the end of this specification.

In the description which follows, reference is made to the accompanying drawings, in which—

Figure 1:
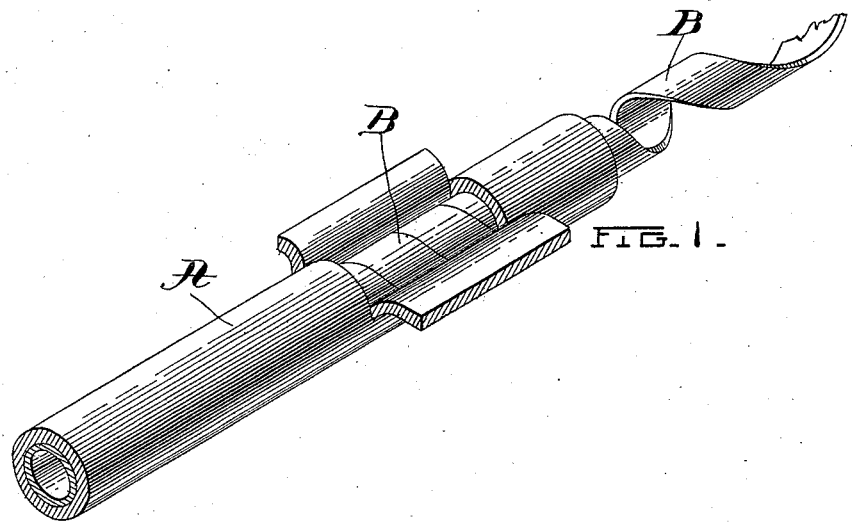
Figure 3:
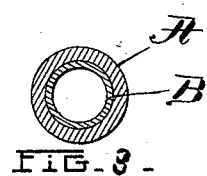
Figure 2:
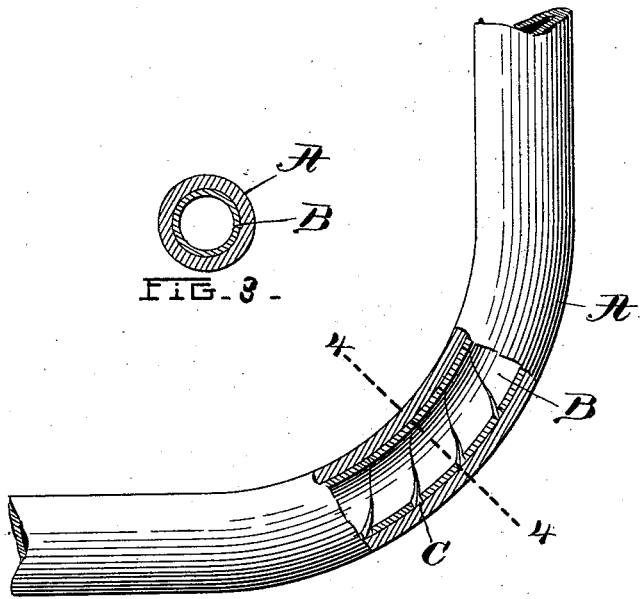

Figure 1 is a view in perspective of a section of a tube or conduit embodying my invention, a portion of the exterior thereof being shown as cut at one side and turned back, the more clearly to show the construction, and a portion of the spiral or inner tube being shown as drawn out at one end of the conduit for the same purpose. Fig. 2 is a view of a tube or conduit embodying my invention, which is curved and which is shown in section at the curved portion to illustrate the position assumed by the parts when the conduit is bent. Fig. 3 is a section on line 4—4 Fig. 2.

Referring to the drawings, A represents a tube of flexible metal, as lead, which may be of any desired thickness and of any requisite diameter. Inside this tube I lay a strip B of flexible paper material, such as leatheroid, fiber board, leatherboard or the like. The strip B is cut to uniform width forming a parallel-sided tape or ribbon, and then is placed inside the tube A in the form of a spiral as shown.

The precise width of the tube or ribbon B which is employed to form the spiral is not essential. The said spiral strip acts as a reinforce or brace and prevents the tube from being indented or from collapsing under the pressure of a blow or accidental strain, and it also serves to keep the interior space of the tube substantially uniform in cross section when the tube is bent so that the tube or conduit will accommodate as many wires or as large a cable throughout its curved portions as throughout its straight portions. As a result a number of wires, or a cable or the like, may be passed through a curved conduit embodying my invention, as well as through a straight one, without binding and without injury. A tube which has a continuous integral tubular lining if bent will break, after bending to a slight extent, and such a tube if not lined will change its cross sectional shape at the bend, whereas a flexible tube or conduit embodying my invention, may be bent to any desired curve without changing (No Model.)

H. H. BROOKS.
FLEXIBLE TUBE.

No. 536,417. Patented Mar. 26, 1895.

Witnesses:
Arthur F. Randall
Alice H. Morrison

Inventor:
Herbert H. Brooks
by Macleod Calver & Randall
his Attorneys,